US012254734B2

(12) United States Patent
Schneider et al.

(10) Patent No.: US 12,254,734 B2
(45) Date of Patent: Mar. 18, 2025

(54) DEVICE AND METHOD FOR SEPARATING VALUE DOCUMENTS, IN PARTICULAR BANKNOTES, AND VALUE DOCUMENT PROCESSING SYSTEM

(71) Applicant: GIESECKE+DEVRIENT CURRENCY TECHNOLOGY GMBH, Munich (DE)

(72) Inventors: Stefan Schneider, Kirchheim (DE); Rudolf Christl, Munich (DE); Roland Kopp, Olching (DE); Gerhard Hossle, Ebersberg (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 86 days.

(21) Appl. No.: 17/421,105

(22) PCT Filed: Dec. 20, 2019

(86) PCT No.: PCT/EP2019/000356

§ 371 (c)(1),
(2) Date: Jul. 7, 2021

(87) PCT Pub. No.: WO2020/143895

PCT Pub. Date: Jul. 16, 2020

(65) Prior Publication Data

US 2022/0084346 A1 Mar. 17, 2022

(30) Foreign Application Priority Data

Jan. 7, 2019 (DE) ..................... 10 2019 000 085.4

(51) Int. Cl.
*B65H 1/18* (2006.01)
*B65H 1/14* (2006.01)
(Continued)

(52) U.S. Cl.
CPC ............... *G07D 11/50* (2019.01); *B65H 1/14* (2013.01); *B65H 1/18* (2013.01); *B65H 3/14* (2013.01);
(Continued)

(58) Field of Classification Search
CPC .................................... B65H 1/18; B65H 1/08
See application file for complete search history.

(56) References Cited

U.S. PATENT DOCUMENTS 4,235,432 A * 11/1980 Marschke ............ B65H 3/0676 271/31
6,182,962 B1 2/2001 Leuthold
(Continued)

FOREIGN PATENT DOCUMENTS

DE 19543634 A1 5/1997
DE 19816181 A1 10/1998
(Continued)

OTHER PUBLICATIONS

International Search Report and Written Opinion from PCT Application No. PCT/EP2019/000356, Apr. 14, 2020.

*Primary Examiner* — Howard J Sanders
(74) *Attorney, Agent, or Firm* — Workman Nydegger

(57) ABSTRACT

An apparatus and a method for singling value documents involve a feeding device adapted to feed a respectively uppermost value document of a stack of value documents to a picking device adapted to pick the value document from the stack. A conveying device is adapted to receive the stack and to convey it relative to the feeding device. A distance sensor is adapted to detect at least one distance of the respectively uppermost value document of the stack received by the conveying device relative to the feeding device and generate at least one corresponding distance sensor signal. A control device is adapted to control the conveying of the stack relative to the feeding device and the
(Continued)

location of the feeding device relative to the stack based on the distance sensor signal.

12 Claims, 2 Drawing Sheets

(51) Int. Cl.

| | |
|---|---|
| ***B65H 3/14*** | (2006.01) |
| ***B65H 3/48*** | (2006.01) |
| ***G07D 11/165*** | (2019.01) |
| ***G07D 11/50*** | (2019.01) |

(52) U.S. Cl.

CPC ............. *B65H 3/48* (2013.01); *G07D 11/165* (2019.01); *B65H 2406/351* (2013.01); *B65H 2406/365* (2013.01); *B65H 2511/15* (2013.01); *B65H 2511/214* (2013.01); *B65H 2553/42* (2013.01)

(56) References Cited

U.S. PATENT DOCUMENTS

| | | | | |
|---|---|---|---|---|
| 7,267,337 B2 * | 9/2007 | Moore | B65H 7/14 | 271/148 |
| 8,857,810 B2 | 10/2014 | Yoshii et al. | | |
| 9,216,869 B2 * | 12/2015 | Hildebrandt | B65H 1/025 | |
| 9,336,589 B2 | 5/2016 | Mochizuki et al. | | |
| 2012/0154795 A1 * | 6/2012 | Kobayashi | B65H 3/5261 | 356/213 |
| 2015/0170349 A1 | 6/2015 | Mochizuki et al. | | |
| 2018/0179001 A1 * | 6/2018 | Kondou | B65H 1/14 | |

FOREIGN PATENT DOCUMENTS

| | | | | |
|---|---|---|---|---|
| GB | 2487726 A | 8/2012 | | |
| JP | 5921006 B2 * | 5/2016 | B42C 1/12 | |
| WO | 2014006747 A1 | 1/2014 | | |

* cited by examiner

DEVICE AND METHOD FOR SEPARATING VALUE DOCUMENTS, IN PARTICULAR BANKNOTES, AND VALUE DOCUMENT PROCESSING SYSTEM

BACKGROUND

The invention relates to an apparatus and a method for singling value documents, in particular banknotes, and to a value document processing system.

Apparatus and methods for singling value documents, in particular banknotes, are often used in value document processing systems in order to pick individual value documents from a stack of value documents supplied and to feed them to further processing, such as, for example, an authenticity and condition check, counting and sorting.

Various approaches are known for picking value documents from a stack, for example with the aid of friction wheels or rollers, friction belts or by suction or blowing of air. A high level of reliability in the singling of the value documents is important in order to ensure the most trouble-free automatic processing of the value documents. In particular, it is important to avoid multiple picks, erroneous picks and/or other disruptions, such as a jamming of value documents in the singler.

SUMMARY

It is the object of the present invention to specify an apparatus and a method for singling value documents, in particular banknotes, as well as a value document processing system by which a reliable singling of value documents, in particular banknotes, is ensured.

An apparatus for singling value documents, in particular banknotes, according to a first aspect of the invention has: a feeding device which is adapted to feed a respectively uppermost value document of a stack of value documents to a picking device which is adapted to pick the value document from the stack, a conveying device which is adapted to receive the stack and convey it relative to the feeding device, at least one distance sensor which is adapted to detect at least one distance of the respectively uppermost value document of the stack received by the conveying device relative to the feeding device and to generate at least one corresponding distance sensor signal, and a control device which is adapted to control the conveyance of the stack relative to the feeding device and/or the position of the feeding device relative to the stack, in particular to the respectively uppermost value document of the stack on the basis of the at least one distance sensor signal.

A value document processing system for processing, in particular for sorting, counting and/or checking value documents, in particular banknotes, according to a second aspect of the invention has an apparatus for singling value documents according to the first aspect of the invention.

In a method for singling value documents, in particular banknotes, according to a third aspect of the invention, a stack of value documents is received by a conveying device, a respectively uppermost value document of the received stack is fed to a picking device by means of a feeding device, said picking device picking the value document from the stack, at least one distance of the respectively uppermost value document of the received stack relative to the feeding device is detected and at least one corresponding distance sensor signal is generated, and a conveyance of the received stack relative to the feeding device and/or a position of the feeding device relative to the stack, in particular to the respectively uppermost value document of the stack is controlled and/or adjusted on the basis of the at least one distance sensor signal.

Aspects of the invention are based on the approach to detect the location and/or position of the respectively uppermost value document of a stack of value documents relative to a feeding device, which is preferably configured as a so-called air baffle plate, by means of one or several distance sensors and to control the conveyance, in particular the so-called tracking, of the stack in the direction of the feeding device and/or away from the feeding device depending on the detected location or position of the respectively uppermost value document of the stack. As an alternative or in addition to the controlling of the conveyance of the stack, the position and/or location of the feeding device relative to the stack, in particular relative to the respectively uppermost value document, can be adjusted on the basis of the at least one detected distance or distance sensor signal. The at least one distance sensor is preferably arranged and/or adapted to generate a distance sensor signal which represents a measure of the distance of the respectively uppermost value document from the feeding device and/or is suitable for characterizing the distance, the position and/or the location of the respectively uppermost value document relative to the feeding device.

This makes it possible to ensure in a simple, cost-effective and robust manner that the respectively uppermost value document of the stack is located in a favorable position or location relative to the feeding device and can be reliably fed by the latter to a picking device, for example a singling roller and/or an air-pressurized singling device, for example with an air baffle plate, by which the value document is finally completely picked from the stack. The air-pressurized singling device can act on the value document by means of underpressure or overpressure.

Particularly when employing an air baffle plate, it can be advantageous to so determine the distance between the air baffle plate and the uppermost value document, i.e. the value document that is to be singled next, that the singling of the value document works reliably. Preferably, only the next value document should be singled and not at least one further document should be picked along with it. Further, the distance should be set in such a manner that the next value document is subjected to sufficient force for singling. For this purpose, the underpressure or overpressure that is applied to the value document to be singled by the air baffle plate can be adjusted in dependence on the ascertained distance. For example, a regulation can be provided which, depending on the distance between the air baffle plate and the uppermost document, adjusts a flow rate at openings in the air baffle plate.

Overall, this makes possible particularly reliable singling of value documents.

In addition to the distance sensor, at least one stack sensor is preferably provided, which is adapted to detect a height and/or a density of the stack of value documents received by the conveying device and to generate a corresponding stack sensor signal. The control device is adapted to control the conveyance of the stack relative to the feeding device and/or the position of the feeding device relative to the stack, in particular to the respectively uppermost value document of the stack, on the basis of the at least one distance sensor signal and the at least one stack sensor signal.

Detection of the height of the stack of value documents by the stack sensor can be understood to mean both a direct measurement of the height of the stack and an indirect determination of a measure for the height of the stack based on the stack sensor signals generated by the stack sensor. If the sensor signals of the stack sensor represent, for example, a measure of an electrical capacitance that depends on the number of value documents located in front of the stack sensor, the number of value documents in the stack and/or the height of the stack can be derived or at least estimated from the stack sensor signals. For example, the at least one stack sensor has a camera, by means of which one or several images of the stack received by the conveying device are detected. Subsequent analysis of the respectively detected image can then be used to infer the respective height of the stack. For example, based on the images detected by the camera, the edges of the value documents located in the stack can be recognized and the respective filling level of the conveying device can be determined therefrom. The filling level of the conveying device characterizes, for example, the ratio of the height of the stack located in the conveying device to the maximum height of a stack that the conveying device can receive.

Detection of the density of the stack of value documents by the stack sensor is preferably to be understood as a determination of a dimensionless measure for the density of the stack based on the stack sensor signals. For example, the at least one stack sensor has a transmitted light barrier through which a density of the stack can be inferred on the basis of a detected intensity of light passing through or weakened by the stack. Alternatively or additionally, a capacitive sensor can be used to detect the density and/or the stack height. From the density of the stack, conclusions can additionally be drawn about the quality of the value documents arranged in the stack, in particular about their creasing, namely whether there tend to be more creased value documents or rather uncreased value documents in the stack or in a certain stack region, preferably in the upper stack region. With increasing creasing and/or low density, for example, the conveyance of the stack relative to the feeding device can be increased and/or the relative distance between the feeding device and the uppermost layer of the stack can be reduced.

One or several of the preferred embodiments described above further improve the tracking of the stack and, along with this, the positioning of the respectively uppermost value document of the stack relative to the feeding device.

For example, a combination of different sensors can be employed to detect the stack. In particular, a combination of a sensor for determining the density of the stack, preferably in a region of the stack that affects the upper value documents of the stack, and a distance sensor can be used. The sensor signals ascertained in this manner can be employed by a control device for controlling the conveyance of the stack. For this purpose, a matrix could be stored for the controller in which, for example, the density of the stack or the stack region and the distance are classified based on threshold values, in order to finally determine a tracking rate or tracking speed. For example, the density could be divided into three categories on account of threshold values, for example high, medium, low. The distance could be divided into three categories, for example small (for a distance <10 mm), medium (for a distance >=10 mm and <25 mm) and large (for a distance >=25 mm). Other divisions are also possible depending on the sensors and evaluation methods. Different tracking thresholds can thus be stored in the matrix for the relative ratio of density to distance, from which the control device finally adjusts a tracking rate or tracking speed.

Based on the sensor signals, the control device can be configured to adjust the pull-off force of the feeding device. The pull-off force is to be understood as the force with which the feeding device removes the uppermost value document from the stack and moves it in a direction and thus singles the uppermost value document from the stack. In one embodiment, the feeding device is configured with an air baffle plate. The control device can adjust the air pressure of the air baffle plate in such a manner that a low air baffle plate pressure prevails at a large detected distance so that the value document can be removed by the air baffle plate, and at a smaller distance the air baffle plate pressure can be increased, i.e. the air baffle plate then acts on the value document with lower underpressure. In addition and/or alternatively, the feeding device can be configured with a side ventilation device, whereby the at least uppermost value document in the stack is acted upon laterally with air in order to loosen the uppermost value document from the stack. The control device can also be configured to adjust the air mass and air flow, both in terms of direction and speed, in accordance with the sensor values.

The control device is preferably adapted to control a speed and/or direction of conveyance of the stack relative to the feeding device on the basis of the at least one distance sensor signal, in particular on the basis of the at least one distance sensor signal and the at least one stack sensor signal. Alternatively or additionally, the control device is preferably adapted to control the conveying device for conveying the stack relative to the feeding device in dependence on the at least one distance of the respectively uppermost value document of the stack such that the stack is conveyed at a first speed in the direction of the feeding device, if the at least one distance is greater than a predetermined first distance value, and/or the stack is conveyed at a second speed, which is lower than the first speed, in the direction of the feeding device, if the at least one distance is smaller than the first distance value, and/or the stack is conveyed at the second speed and/or at a third speed different from the second speed in the direction of the feeding device and/or away from the feeding device, if the at least one distance of the respectively uppermost value document of the stack relative to the feeding device is smaller than a predetermined second distance value, which is smaller than the first distance value. This makes it possible to adjust different operating modes for the tracking of the stack.

If, for example, it is determined based on the distance sensor signal that the distance of the respectively uppermost value document from the feeding device is greater than, for example, 40 mm (predetermined first distance value), a high speed (first speed) is adjusted for fast tracking in the direction of the feeding device. The level of this first speed is preferably fixed and cannot be adjusted manually, for example by a service technician. In this case, the first speed corresponds to the maximum speed provided for operating the apparatus.

If, on the other hand, it is determined based on the distance sensor signal that the distance of the respectively uppermost value document from the feeding device is smaller than the predetermined first distance value of 40 mm, for example, a medium or normal speed (second speed) is adjusted for tracking the stack in the direction of the feeding device. The apparatus is preferably set up in such a manner that the level of this second speed can be predetermined manually, for example by an operator, or else automatically.

If, based on the distance sensor signal, it is also found that the distance between the respectively uppermost value document of the stack relative to the feeding device is smaller than a predetermined second distance value of, for example, 10 mm, it can be provided that the speed of tracking the stack continues at the second speed or the second speed is re-regulated so that the tracking takes place at a third speed that deviates from the second speed.

Of course, other threshold values and speeds can also be set for different distance ranges. In one embodiment, five speeds corresponding to five distance ranges can also be set. Thus, it would be conceivable that when a distance value of the uppermost value document is recognized by the feeding device from 0 mm to a specific distance value of 15 mm (first distance range) it has a first speed for tracking the stack of 0 mm/s. If the distance value falls within a second distance range, which defines a greater distance than the first distance range, for example a distance of 15 mm to 20 mm, then a second speed for tracking the stack of 3.5 mm/s or 35 value documents per second is set. If the distance value falls within a third distance range, which defines a greater distance than the second distance range, for example a distance of 20 mm to 25 mm, a third speed for tracking the stack of 3.9 mm/s or 40 value documents per second is set. If the distance value falls within a fourth distance range, which defines a greater distance than the third distance range, for example a distance of 25 mm to 35 mm, then a fourth speed for tracking the stack is set which is higher than the third speed, for example 5 mm/s. If the distance value falls within a fifth distance range, which defines a greater distance than the fourth distance range, for example a distance of more than 35 mm, a fifth speed for tracking the stack of 8 mm/s is set.

Instead of the tracking speed specified here, a tracking section can also be specified for each singling cycle, which also falls under the concept of tracking speed. The singling cycle specifies, for example, a time between two singling steps, or specifies a time between the start of the singling step of a first value document and the start of a singling step of a second banknote. At a singling rate of, for example, 33 banknotes per second, a singling cycle of approx. 0.031 s would result. The distance is preferably determined anew with each singling cycle. The speed for tracking is preferably set based on the ascertained distance. For this purpose, a tracking path to be covered can be specified for the tracking, i.e. that it is predetermined for the tracking to move the stack of banknotes by the tracking path in the direction of the feeding device within one singling cycle. Here, too, different tracking paths can result analogously to the speeds already described, for example in dependence on distances, for example a first tracking path of 0 μm, a second tracking path of 85 μm, a third tracking path of 100 μm, a fourth tracking path of 200 μm and a fifth tracking path of 400 μm, whereby there results a tracking speed from the tracking path and the singling cycle.

Alternatively or additionally, it can also be provided that an inverse tracking is activated, in which the conveying device together with the stack of value documents located thereon is again guided away a little from the feeding device. This takes place, for example, when there results from the distance sensor signal and the currently adjusted speed of the conveying device that the respectively uppermost value document of the stack only has a temporal distance of 50 ms or less from the feeding device, i.e. it takes 50 ms or less than 50 ms to contact the feeding device at the given speed. Preferably, the speed (second or third speed) can also be adjusted in this operating mode.

It is further preferred that the feeding device is configured as an air baffle plate, which is adapted to suction the respectively uppermost value document of the stack and thereby lift it off the stack and convey it in the direction of the picking device.

In a further preferred embodiment, the feeding device, in particular configured as an air baffle plate, is pivotably mounted and a driving device is provided, for example in the form of a stepper motor, which is adapted to set an inclination angle of the feeding device relative to the conveying device and/or relative to the stack, in particular to the respectively uppermost value document of the stack, by pivoting the feeding device.

The control device is preferably adapted to control the driving device for adjusting the inclination angle of the feeding device relative to the conveying device or to the stack, in particular to the respectively uppermost value document of the stack, on the basis of the at least one distance sensor signal, in particular on the basis of the at least one distance sensor signal and the at least one stack sensor signal. Alternatively or additionally, the control device is adapted to control the driving device so that the inclination angle of the feeding device is adjusted such that the feeding device extends substantially parallel to the respectively uppermost value document of the stack. This ensures in a simple and reliable manner that the respectively uppermost value document of the stack always has a desired or ideal position and/or location relative to the feeding device. For example, it can be reliably achieved that there is always a small but finite distance or gap present between the respectively uppermost value document and the feeding device. This ensures particularly reliable feeding of the value document to the picking device, for example a singling gap.

The at least one distance sensor is preferably configured as an optical and/or acoustic and/or capacitive sensor, which is adapted to detect the at least one distance of the respectively uppermost value document relative to the feeding device by means of electromagnetic waves, acoustic waves or capacity determination. An optical sensor, for example a so-called laser path measurement sensor, can be operated with a high sampling rate if necessary or advantageously and the signals generated in each case can be evaluated with a corresponding algorithm. This makes it possible to take into account, for example, the circumstance that a feeding device configured as an air baffle plate influences by the suction not only the respectively uppermost value document, but also one or several value documents located below the uppermost value document, moving them upwards or in the direction of the feeding device. By means of acoustic sensors, for example so-called ultrasonic path measurement sensors, the value documents possibly located below the respectively uppermost value document can also be reliably detected.

The invention advantageously makes it possible to provide a relatively simple evaluation logic and to simplify the structure of the apparatus or to render it more cost-effective, for example by omitting a so-called rocker for tracking and/or feeding the stack and/or additional light barriers or photodiodes for recognizing value documents on the deposit element of the conveying device. Further, an improved singling of the value documents is possible, since, among other things, influences such as edge contrast, folded or inclined value documents or light incidence from outside can be eliminated or compensated. The cleaning effort or cleaning problems can be reduced as well. The preferred option of aligning the inclination angle of the feeding device can further increase the reliability of the singling.

Preferably, the control device can be adapted to ascertain or at least estimate, based on the distance sensor signals, the number of value documents located or remaining on the support element, e.g. in the form of a rake, of the conveying device and, optionally, to output a signal output (so-called reload signal) to an operator to the effect that further value documents can be inserted into the apparatus. Alternatively or additionally, the control device can be adapted to recognize based on the distance sensor signals that or when the support element, e.g. in the form of a rake or a rocker, has reached a maximum and/or uppermost position. As an alternative or additionally, the control device can be adapted to recognize different formats of the value documents based on the distance sensor signals In the above-mentioned embodiments, additional sensors and/or camera(s) previously provided specifically for these purposes can be omitted.

BRIEF DESCRIPTION OF THE DRAWINGS

Further advantages, features and application possibilities of the present invention will result from the following description in connection with the figures. There are shown.

DETAILED DESCRIPTION OF VARIOUS EMBODIMENTS

Figure 1:
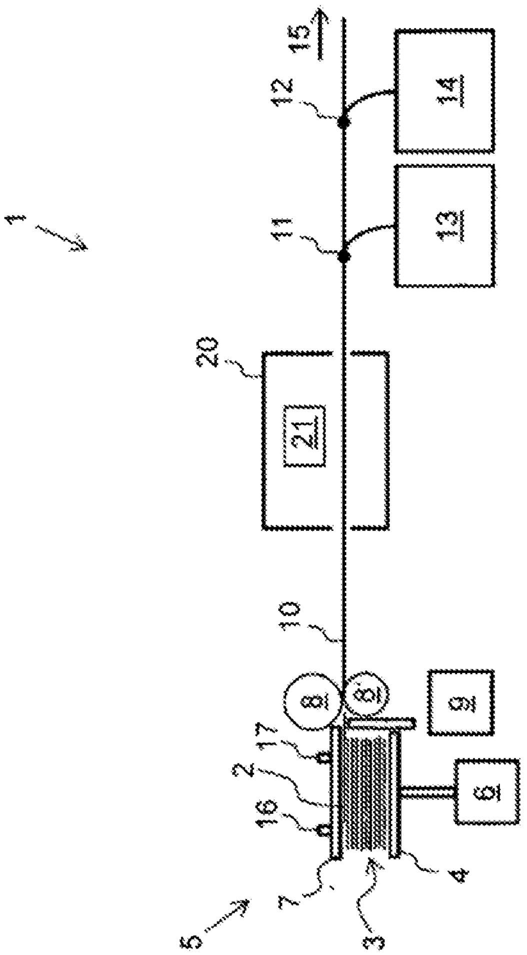
FIG. 1 an example of a value document processing system.

FIG. 1 shows a schematic representation of an example of a value document processing system 1 with a first example of an apparatus 5 for singling value documents 2, in particular banknotes, which are inserted into the apparatus 5 in the form of a stack 3 and conveyed by a conveying device 4, 6 in the direction of a feeding device 7.

In the present example, the conveying device 4, 6 has a support element 4, preferably configured as a rake, which can be moved towards the feeding device 7 and/or away from the feeding device 7 with the aid of a conveying drive 6.

The feeding device 7 is preferably configured as a so-called air baffle plate, which is adapted to suction the respectively uppermost value document 2 located on the stack 3 with the aid of a stream of air and thereby lift it off the stack 3 and convey it towards a so-called singling roller 8 which—possibly in interaction with further singler elements—picks the value document 2 from the stack 3 and transfers it to a transport apparatus 10. Possible further singler elements, e.g. in the form of one or several rollers and/or belts are represented in the present example only by a so-called retention roller 8' for illustrative reasons.

The singled value documents 2 are conveyed by the transport device 10 to a checking apparatus 20 in which the value documents 2 are checked with respect to their properties, such as, for example, denomination and/or condition and/or authenticity. For this purpose, one or several checking sensors 21 are provided which detect the physical properties of the value documents 2 and convert them into corresponding sensor signals which are evaluated in a control device 9.

The control device 9 is further adapted to control switches 11, 12 in such a manner that the processed value documents 2 are transferred into a first or second container 13 or 14 depending on the properties ascertained in each case. Here, for example, value documents 2 in a good condition (“fit”) are deposited in the first container 13 and value documents 2 in a poor condition (“unfit”) in the second container 14. Depending on the application case, the value documents 2 can also be stored in the different containers 13, 14, for example in line with the denomination. Further switches and further containers (not represented) or further processing elements, such as, for example, a shredder for destroying value documents 2 with certain properties, can also be provided, which is indicated by an arrow 15.

In the region of the feeding device 7, one or several distance sensors 16, 17 are arranged, which are adapted to detect a distance of the respectively uppermost value document 2 of the stack 3 relative to the feeding device 7 and/or to the distance sensors 16, 17 and to generate corresponding distance sensor signals.

The control device 9 is adapted to control and/or adjust the conveyance of the stack 3 relative to the feeding device 7 and/or the position of the feeding device 7 relative to the stack 3, in particular relative to the respectively uppermost value document 2 of the stack 3, on the basis of the distance sensor signals or signals or parameters derived therefrom. As a result, it is possible to adjust in a simple and cost-effective manner a location or position of the stack 3 or of the respectively uppermost value document 2 relative to the feeding device 7 which is advantageous for a particularly reliable singling of the value documents of the stack 3.

Figure 2:
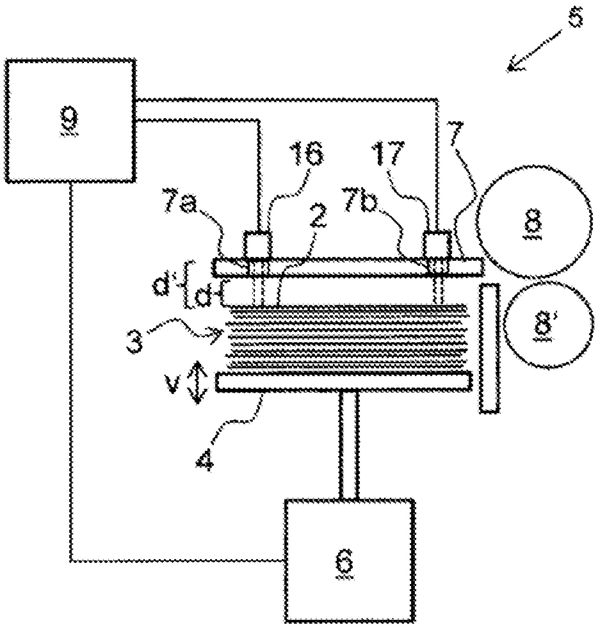
FIG. 2 a second example of an apparatus for singling value documents.

FIG. 2 shows a schematic representation of a second example of an apparatus 5 for singling value documents 2, in particular banknotes. In the present example, two distance sensors 16, 17 are provided, which are configured, for example, as optical path measurement sensors and are arranged above the feeding device 7. An optical path measurement sensor preferably has an optical detector and a light source which sends at least one, preferably visible or infrared, light beam (shown in dashed lines) in the direction of the value document 2 and detects the light reflected by value document 2 with the aid of the optical detector. Even if the distance sensors 16, 17 are in contact with the upper side of the feeding device 7 in the present representation, they can in principle also be spaced apart from the upper side of the feeding device 7. It would also be possible that the distance sensors are integrated in the feeding device 7 or are arranged on the lower side of the feeding device 7, i.e. on the side of the feeding device 7 which is directed towards the stack 3.

In the present example, the feeding device 7 has two breakthroughs 7*a* and 7*b* through which the light emitted by the respective distance sensor 16, 17 and the light reflected by the respective value document 2 can pass through the feeding device 7.

Based on the distance sensor signals generated by the distance sensors 16, 17, a distance d of the stack 3 or of the respectively uppermost value document 2 from the feeding device 7 is ascertained in the control device 9. Alternatively or additionally, it is also possible that a distance d' between the respective distance sensor 16 or 17 on the one hand and the respectively uppermost value document 2 of the stack 3 on the other hand is ascertained based on the distance sensor signals. Since the distance d' ascertained here differs only by a known amount—in the present example by the height of the feeding device 7—from the distance d, the distance d' also represents a measure of the distance of the respectively uppermost value document 2 relative to the feeding device 7 within the meaning of the present invention.

The control device 9 is preferably adapted to control the speed v and/or the direction of conveyance of the stack 3 relative to the feeding device 7 on the basis of the distance sensor signals and/or a distance d or d' ascertained therefrom. For example, different modes of operation for tracking the stack 3 can be provided for this purpose. To illustrate this, three different operating modes are explained below by way of example.

i) If, for example, it is found that the uppermost value document 2 has a distance d from the feeding device 7 which is greater than, for example, 40 mm, a tracking speed v that is faster with reference to a pre-adjusted normal or standard tracking speed is adjusted through corresponding activation of the conveying drive 6.

ii) If, for example, there results that the distance d is less than 40 mm, a slower, in particular a pre-adjusted normal, tracking speed v is adjusted through corresponding activation of the conveying drive 6.

iii) If, for example, there results that the distance d between the uppermost value document 2 and the feeding device 7 is smaller than, for example, 10 mm, an assessment of the normal tracking speed adjusted so far can take place in the control device 9 and, optionally, the tracking speed can be re-regulated. Optionally, an inverse tracking, i.e. a conveyance of the stack 3 or the support element 4 away from the feeding device 7, can also take place.

The above-described detection of distances d or d' of the stack 3 or the respectively uppermost value document 2 of the stack 3 from the feeding device 7 can in principle take place with only one distance sensor 16 or 17 or also with more than two distance sensors. This applies correspondingly to the controlling of the tracking of the stack 3 on the basis of one or more than two distance sensor signals or the distances d and d' derived therefrom.

As an alternative or in addition to optical path measurement sensors, the distance sensors 16, 17 can also be configured as acoustic, for example ultrasound-based, and/or capacitive sensors.

As an alternative or in addition to the controlling of the tracking of the stack 3 described above, it is possible to change the position and/or location of the feeding device 7 relative to the stack 3 and/or relative to the respectively uppermost value document 2 of the stack 3 on the basis of the distance sensor signals or the distances d and d' derived therefrom. This will be explained in more detail below.

Figure 3:
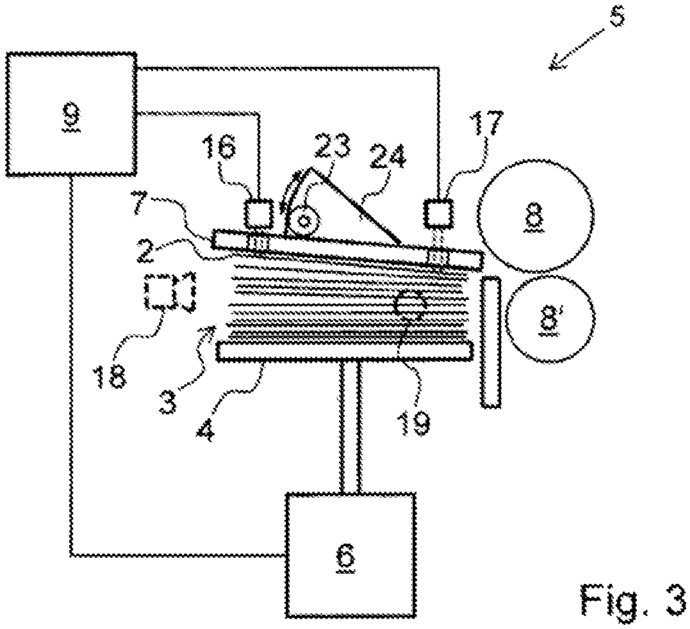
FIG. 3 a third example of an apparatus for singling value documents.

FIG. 3 shows a third example of an apparatus 5 for singling value documents. In contrast to the example shown in FIG. 2, the feeding device 7 is pivotably mounted so that, if necessary, it can be pivoted out of a location substantially parallel to the support element 4 in order to preferably assume a location substantially parallel to the respectively uppermost value document 2.

For this purpose, a driving device 23, 24 is provided, which is represented only very schematically in the present example and has, for example, a stepper motor 23 which is fixedly arranged in the apparatus 5 and which interacts, e.g. via a gear, with an actuating element 24 provided on the feeding device 7, so that said actuating element can be pivoted together with the feeding device 7 in a direction indicated by a double arrow.

The distance sensors 16, 17 preferably detect the distance of the respectively uppermost value document 2 from the feeding device 7 several times and/or at short intervals and/or continuously during the pivoting of the feeding device 7, wherein the control device 9 controls the driving device 23, 24 in dependence on the distance sensor signals generated thereby, and in particular adjusts an inclination angle of the feeding device 7 which substantially corresponds to the inclination of the respectively uppermost value document 2.

In addition to adjusting the inclination angle of the feeding device 7, it is also possible to effect a tracking of the stack 3 with the aid of the conveying device 4, 6 on the basis of the distance sensor signals or the distances derived therefrom.

As an alternative or in addition to pivoting the feeding device 7, it is also possible to determine a height and/or density of the stack 3 and to effect a tracking of the stack 3 with the aid of the conveying device 4, 6 in dependence on the ascertained height or density of the stack.

The height of the stack 3 can be detected, for example, by means of a camera 18, the images of which are analyzed in the control device 9, for example by means of automatic detection of the edges of the value documents. The density of the stack 3 can be determined with the aid of a transmitted light barrier 19, for example.

The control device 9 is preferably adapted to control the conveying device 4, 6 for tracking the stack 3 and/or the driving device 23, 24 for pivoting the feeding device 7 on the basis of both the distance sensor signals or the distances derived therefrom and the ascertained height and/or density of the stack 3.

The invention claimed is:

1. An apparatus for singling value documents, comprising:

a feeding device, which is adapted to feed a respectively uppermost value document of a stack of value documents to a picking device which is adapted to pick the value document from the stack, a conveying device, which is adapted to receive the stack and to convey it relative to the feeding device, at least one distance sensor, which is adapted to measure at least one distance of the respectively uppermost value document of the stack relative to the feeding device and to generate at least one corresponding distance sensor signal, at least one stack sensor which is adapted to detect a height from the respectively uppermost value document of the stack to a lowermost value document of the stack and/or a density of the stack of value documents and to generate at least one corresponding stack sensor signal, and a control device, which is adapted to control the conveyance of the stack relative to the feeding device and/or the location of the feeding device relative to the stack, to the respectively uppermost value document of the stack, on the basis of the at least one distance sensor signal and the at least one stack sensor signal.

2. The apparatus according to claim 1, wherein the control device is adapted to control a speed and/or direction of the conveyance of the stack relative to the feeding device on the basis of the at least one distance sensor signal, or on the basis of the at least one distance sensor signal and the at least one stack sensor signal.

3. The apparatus according to claim 1, wherein the feeding device is configured as an air baffle plate, which is adapted to suction the respectively uppermost value document of the stack and thereby lift it off the stack and convey it in the direction of the picking device.

4. The apparatus according to claim 1, wherein the feeding device, configured as an air baffle plate, is pivotably mounted and a driving device is provided which is adapted to adjust an inclination angle of the feeding device relative to the conveying device and/or relative to the stack, to the respectively uppermost value document of the stack, by pivoting the feeding device.

5. The apparatus according to claim 4, wherein the control device is adapted to control the driving device for adjusting the inclination angle of the feeding device relative to the conveying device or to the stack, to the respectively uppermost value document of the stack, on the basis of the at least one distance sensor signal, or on the basis of the at least one distance sensor signal and the at least one stack sensor signal.

6. The apparatus according to claim 4, wherein the control device is adapted to control the driving device to adjust the inclination angle of the feeding device such that the feeding device extends substantially parallel to the respectively uppermost value document of the stack.

7. The apparatus according to claim 1, wherein the control device is adapted to control the conveying device for conveying the stack relative to the feeding device in dependence on the at least one distance of the respectively uppermost value document of the stack such that the stack is conveyed at a first speed in the direction of the feeding device, if the at least one distance is greater than a predetermined first distance value, and/or the stack is conveyed at a second speed, which is lower than the first speed, in the direction of the feeding device, if the at least one distance is smaller than the first distance value, and/or the stack is conveyed at the second speed and/or a third speed different from the second speed in the direction of the feeding device and/or away from the feeding device, if the at least one distance of the respectively uppermost value document of the stack relative to the feeding device is smaller than a predetermined second distance value, which is smaller than the first distance value.

8. The apparatus according to claim 1, wherein the at least one distance sensor is configured as an optical and/or acoustic and/or capacitive sensor which is adapted to detect the at least one distance of the respectively uppermost value document relative to the feeding device by means of electromagnetic waves, acoustic waves or capacity determination, respectively.

9. A value document processing system for processing, for sorting, counting and/or checking value documents with an apparatus for singling value documents according to claim 1.

10. The apparatus according to claim 1, wherein the at least one distance sensor is located above the feeding device, the feeding device having at least one breakthrough through which light emitted by the at least one distance sensor and light reflected by the respective value document can pass through the feeding device.

11. A method for singling value documents, in which a stack of value documents is received by a conveying device and a respectively uppermost value document of the received stack is fed by means of a feeding device to a picking device which picks the value document from the stack, wherein at least one distance of the respectively uppermost value document of the received stack relative to the feeding device is measured and at least one corresponding distance sensor signal is generated, a height and/or a density of the stack of value documents is measured and at least one corresponding stack sensor signal is generated, and a conveyance of the received stack relative to the feeding device and/or a location of the feeding device relative to the stack, to the respectively uppermost value document of the stack, is controlled and/or adjusted on the basis of the at least one distance sensor signal and the at least one stack sensor signal.

12. An apparatus for singling value documents, comprising:

a feeding device, which is adapted to feed a respectively uppermost value document of a stack of value documents to a picking device which is adapted to pick the value document from the stack, a conveying device, which is adapted to receive the stack and to convey it relative to the feeding device, at least one distance sensor, which is adapted to detect at least one distance of a gap present between the respectively uppermost value document of the stack and the feeding device and to generate at least one corresponding distance sensor signal, said distance signal representing a measure of the gap between the respectively uppermost value document and the feeding device and/or characterizing a size, position, and/or location of the gap between the respectively uppermost value document and the feeding device, at least one stack sensor which is adapted to detect a height and/or a density of the stack of value documents and to generate at least one corresponding stack sensor signal, and a control device, which is adapted to control the conveyance of the stack relative to the feeding device and/or the location of the feeding device relative to the stack, to the respectively uppermost value document of the stack, on the basis of the at least one distance sensor signal and the at least one stack sensor signal.

* * * * *